(12) United States Patent
Koschella

(10) Patent No.: US 7,054,121 B2
(45) Date of Patent: May 30, 2006

(54) PROTECTION CIRCUIT FOR PREVENTING UNAUTHORIZED ACCESS TO THE MEMORY DEVICE OF A PROCESSOR

(75) Inventor: Dietmar Koschella, Denzlingen (DE)

(73) Assignee: Micronas GmbH, Freiburg (DE)

( * ) Notice: Subject to any disclaimer, the term of this patent is extended or adjusted under 35 U.S.C. 154(b) by 378 days.

(21) Appl. No.: 10/117,975

(22) Filed: Apr. 8, 2002

(65) Prior Publication Data

US 2002/0166034 A1 Nov. 7, 2002

(30) Foreign Application Priority Data

Apr. 6, 2001 (EP) ............................................. 01108711

(51) Int. Cl.
*H02H 47/00* (2006.01)

(52) U.S. Cl. .......................................... 361/1; 361/115
(58) Field of Classification Search ................. 361/115, 361/160, 62, 1; 711/163, 138
See application file for complete search history.

(56) References Cited

U.S. PATENT DOCUMENTS

| 4,523,271 A | 6/1985 | Levien ........................ 364/200 |
| 4,796,235 A | 1/1989 | Sparks et al. ................ 365/228 |
| 5,557,743 A | 9/1996 | Pombo et al. ............... 395/186 |
| 5,974,500 A | 10/1999 | Maletsky et al. ........... 711/103 |
| 6,397,301 B1 * | 5/2002 | Quach et al. ................ 711/138 |
| 6,665,782 B1 * | 12/2003 | Capps et al. ................ 711/163 |

* cited by examiner

*Primary Examiner*—Stephen W. Jackson
(74) *Attorney, Agent, or Firm*—O'Shea, Getz & Kosakowski, P.C.

(57) ABSTRACT

A protection circuit (1) is coupled to a processor (2) and a memory device (3) which preferably form a physical unit, and prevents unauthorized access to the memory device (3) by combining internal and/or external signals (s2, s3, s4; s1) in a logic device (5) for detecting the unauthorized access. These signals are control signals of the processor-memory system and correspond to the status of the latter. In the event of an unauthorized memory access, the logic device (5) disables an externally accessible data interface (6) and/or inhibits the control signals (s5) necessary for access to the memory device (3).

10 Claims, 6 Drawing Sheets

| | | | |
|---|---|---|---|
| CE | = | $0000.0000_H \ldots 00FF.FFFF_H$ | B |
| CE memory 0 | = | $0000.0000_H \ldots 0000.03FF_H$ | B0 |
| CE memory 1 | = | $0000.0400_H \ldots 0000.0FFF_H$ | B1 |
| CE memory 2 | = | $0000.1000_H \ldots 0001.FFFF_H$ | B2 |
| ⋮ | | | ⋮ |
| CE memory n | = | $00F0.0000_H \ldots 00FF.FFFF_H$ | Bn |

| | MRPQ i | CEQ | JTAG | TEST | CE memory i | RE | RE memory i | MEMORY ACTION |
|---|---|---|---|---|---|---|---|---|
| 1 | 0 | x | x | x | x | 0 | 0 | — |
| 2 | 0 | x | x | x | 0 | x | 0 | — |
| 3 | 0 | x | x | x | 1 | 1 | 1 | Lesen / Read |
| 4 | 1 | 0 | x | x | x | 0 | 0 | — |
| 5 | 1 | 0 | x | x | 0 | x | 0 | — |
| 6 | 1 | 0 | x | x | 1 | 1 | 0 | — |
| 7 | 1 | 1 | x | x | x | 0 | 0 | — |
| 8 | 1 | 1 | x | x | 0 | x | 0 | — |
| 9 | 1 | 1 | 0 | 0 | 1 | 1 | 1 | Lesen / Read |
| 10 | 1 | x | 1 | x | x | x | 0 | — |
| 11 | 1 | x | x | 1 | x | x | 0 | — |

Fig. 10

PROTECTION CIRCUIT FOR PREVENTING UNAUTHORIZED ACCESS TO THE MEMORY DEVICE OF A PROCESSOR

BACKGROUND OF THE INVENTION

The present invention relates to the field of processors, and in particular to a microcontroller that includes a protection circuit forming part of a processor unit (e.g., a central processing unit) with associated memory device.

Because of their many uses, processors, controllers, or CPUs are increasingly being employed in various areas to perform tasks that were previous accomplished mechanically, electronically, or electromechanically. Current techniques generally use microcontrollers (μCs), which are implemented in monolithic integrated circuit technology. Adaptation to the respective task is accomplished via an executable program stored in the memory device. According to the respective program being executed, the processor fetches from the memory device the necessary data such as desired values, limit values, coefficients, key information, etc., which the program needs for the control task being executed. Whether the memory device is integrated wholly or in part with the microcontroller, or forms a separate physical unit depends on the type of microcontroller and the amount of memory required.

To optimize the individual control tasks and for testing purposes, it is usually possible to keep track of or selectively intervene in the bidirectional data communication traffic between the processor(s) and the memory device via externally accessible data interfaces. Such an intervention involves reading of the contents of the memory device. Another intervention is the reprogramming of the contents of the memory device, for example to adapt particular programs or coefficients to new conditions or erase the memory contents in whole or in part. However, in many cases external read or write access is not desired so unauthorized access to at least some areas of the memory device should be prevented or at least be made very difficult.

In many cases protection systems using secret keywords are not appropriate. In one example, a separate keyword is reserved for each processor/memory system. However, the management of the components with the many keywords becomes complicated. In another example, a universal keyword is used for a large number of processors and associated memory devices. However, if the universal keyword becomes known, protection will be lost for all members of the group. An example is the unauthorized reproduction of electronic motor or chassis controls in the automotive field, which is also called "cloning". Other examples of unauthorized accesses are alterations of operating-hour readings, maintenance services records, in the case of automobiles, mainly alterations of odometer readings, and the like.

Therefore, there is a need to provide protection against unauthorized access to a memory device associated with a processor.

SUMMARY OF THE INVENTION

To detect an unauthorized memory access, a protection circuit comprises a logic device that is fed by internal and external status and control signals from the processor, the memory device, and possibly from other sources. Upon detection of an unauthorized memory access the protection circuit disables an externally accessible data interface or the read and/or write function of the memory device or both by not producing or not forwarding the necessary signals or by producing disabling signals. The protection may cover the entire memory device or only portions thereof, as required. For each portion, a different protection function may be provided that prevents only reads or only writes or both reads and writes. The protection is so designed that it first permits the programming of the memory device but can be canceled after the simultaneously occurring activation only if this is permitted by the programmed protection.

The protection functions for the individual memory areas are stored in a protected area of the memory device itself, which is no longer overwritable if necessary.

The invention has the advantage that access is only disabled in the event of an unauthorized access attempt, while during any subsequent normal operation, operational capability is fully maintained. There is no blocking of functions as is initiated in the case of a credit card after three unsuccessful attempts, or not even a destruction of the processor-memory system or parts thereof for example by irreversible hardware measures, such as opening of lines on the chip. If, in addition, keywords or encryption programs are used whose essential parts are contained in memory areas that are not externally accessible, security is further increased.

These and other objects, features and advantages of the present invention will become more apparent in light of the following detailed description of preferred embodiments thereof, as illustrated in the accompanying drawings.

BRIEF DESCRIPTION OF THE DRAWING

FIG. 10 shows typical signals with respective logic levels in the form of a table.

DETAILED DESCRIPTION OF THE INVENTION

Figure 1:
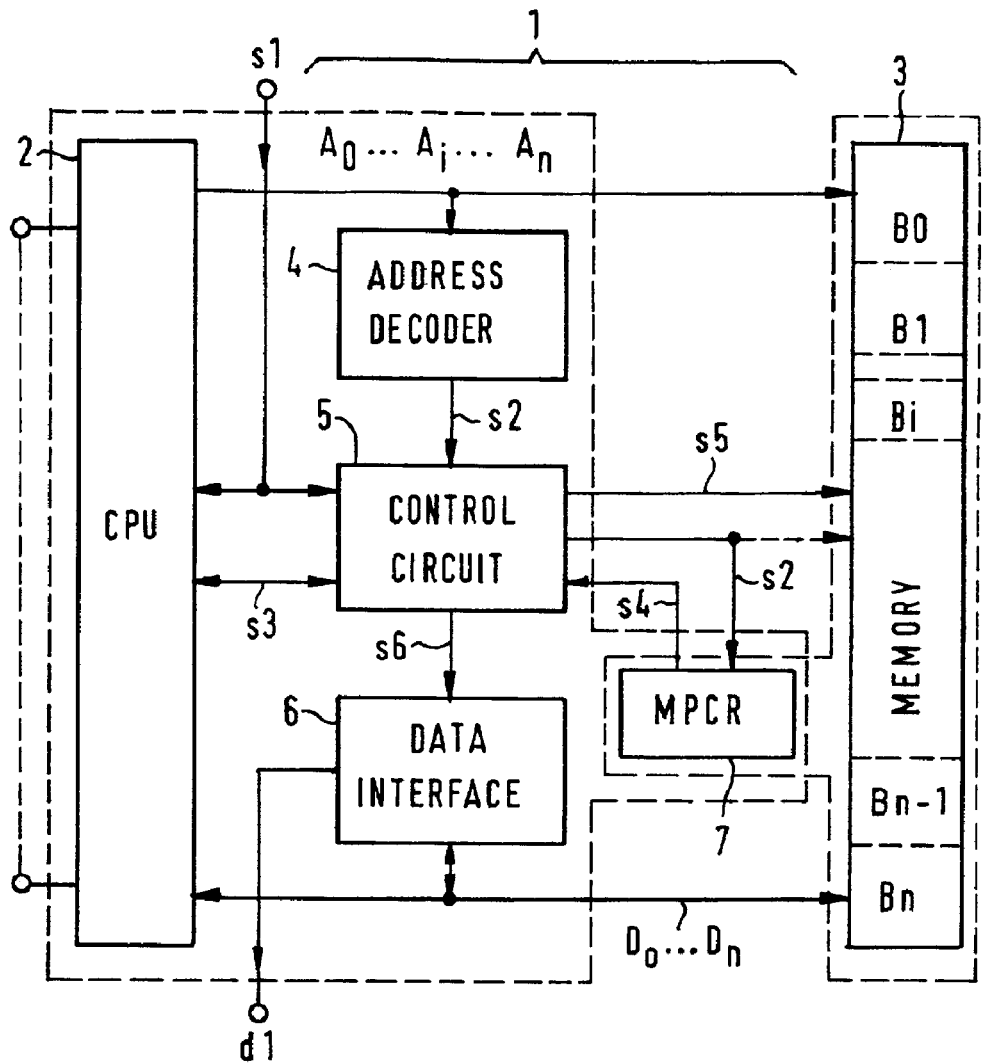
FIG. 1 is a block diagram illustration of a processor-memory system with a protection circuit.

Referring to FIG. 1, an embodiment of a protection circuit 1 that operates with a processor 2 (e.g., a CPU) and a memory device 3 is shown schematically in block-diagram form. The protection circuit 1, the processor 2, and the associated memory device 3 preferably form a physical unit, for example by being integrated on a single chip or by forming a hybrid circuit within a single housing. If large amounts of memory are required, it may be appropriate on cost grounds not to integrate the memory device and the CPU on the same chip, but to use a standardized memory device within a hybrid circuit or within another circuit combination. Thus, the protection circuit 1 with its functional blocks 4, 5, 6, 7 will, as a rule, be an ancillary circuit of the processor 2 with the exception of the functional block 7. The individual functional blocks are an address decoder 4, a logic device 5, an externally accessible data interface 6, and a memory protection control register (MPCR) 7 that holds the individual access authorizations.

The program execution in the processor 2 is divided into instruction cycles and data cycles. During an instruction cycle the CPU 2 fetches the next instruction to be executed from a program sequence that is stored in the CPU or in the memory device 3. The instruction cycle is followed by one or more data cycles in which the CPU fetches or delivers data. Preferably, data is read from and written back to the memory device 3, where the read and write locations may be assigned to different memory areas Bi. Of course, the reading and writing may also take place at other locations addressable by the CPU, depending on the preceding instruction. However, for the task to be performed it is assumed that the data to be protected is only data of the memory device 3.

The memory device 3 may be divided into a plurality of individual areas B0, B1, . . . Bi, . . . Bn or segments that have to be treated differently in the event of an unauthorized external memory access. For instance, there may be first areas that permit neither reading nor writing, with the term "writing" relating to the overwriting with new data or to the erasure of existing data. In second areas reading of data is permitted, but not writing. In third areas writing is permitted, but not reading. In fourth areas there is no restriction whatsoever (i.e., both reading and writing are permitted in these memory areas). The protection function that is assigned to the individual memory areas is recorded in the MPCR 7.

The MPCR 7 may be contained as a separate register in the microcontroller, or preferably in the memory device 3. The latter realization is particularly advantageous in that the MPCR 7 can then be located in a read- and write-protected area. This ensures that after initial programming the protection function for the entire memory device 3 cannot be disabled without special measures being taken.

Figure 3:
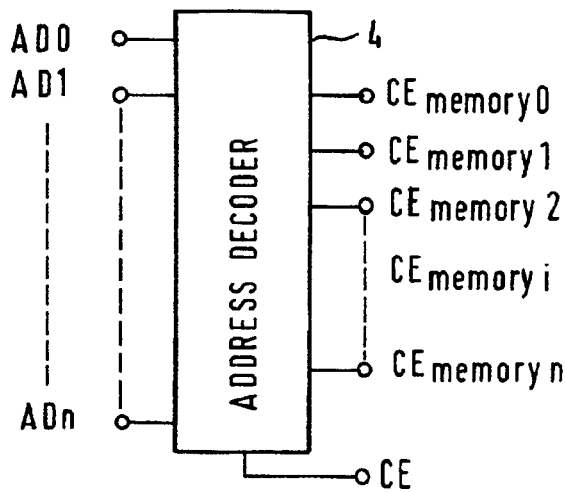
FIG. 3 shows schematically an address decoder.

The definition of the individual memory areas takes place in the address decoder 4, which forms from the applied addresses $A_0, \ldots A_i, \ldots, A_n$ an area signal s2 according to the addressed memory area Bi (e.g., the area signal $CE_{memory\ i}$ in FIG. 3). The sizes of the individual memory areas are predetermined by the information about the area limits in the address decoder 4.

The determination whether a memory access is an authorized or unauthorized access is made in logic device 5, which combines internal and external signals s2, s3, s4, and s1 and recognizes an authorized or unauthorized access by the result. The basic access permission for the addressed memory area Bi is retrieved from the MPCR 7.

In the event of an authorized memory access, the processor 2 reads from or writes to the memory device 3 at the respective address Ai by means of the control signal s3, s5. The data to be read or written, $D_0, \ldots, D_n$, can also be read as data d1 at the externally accessible data interface 6 or written from there into the memory device 3. Standardized examples of such data interfaces 6 are known as "Test Bus" or Joint Test Action Group (JTAG). They are activated via a suitable external signal s1, which in the case of processors and microcontrollers is commonly referred to as "TEST" and "JTAG", respectively. In that case, the logic device 5 between the CPU 2 and the memory device 3 is "transparent", although it combines internal and external signals s2, s3, s4, and s1.

In the event of an unauthorized memory access, the logic device 5 prevents the output of the signals s5 necessary to read from or write into the memory device 3, or disable at least the externally accessible interface 6 via a disabling signal s6. The information about the access rights for the respective memory area is requested by the logic device 5 from the register 7 by means of the area signal s2, which serves as an address. The register 7 then returns the requested information via signal s4.

A condition for access protection is that access by the CPU 2 to the memory device 3 must not be hampered during normal operation. In the regular operating mode the CPU 2 performs a complete instruction data cycle in which the next instruction, and thus the next program step, is loaded into the CPU. The CPU then initiates the associated control instruction(s) (e.g., reading and/or writing) for the memory device 3 to be protected or for other data sources or sinks. This regular operating cycle is recognized, for example, by combining a status signal s3 with an area signal s2. The status signal s3 is for instance an op-code fetch signal OPC that is logically combined with the area signal $CE_{memory\ i}$. The op-code fetch signal is produced by the CPU on each memory access. Subsequent data accesses to the same area Bi of memory device 3 until the next op-code fetch signal are permitted without regard to the access rights provided. This does not apply if inhibiting information is provided for this area and reading or overwriting is attempted via the data interface 6 by a "TEST" or "JTAG" signal.

An irregular memory access may be characterized by the fact that it involves specific contradictions between the signals s2, s3, s4. This is also checked. For reading and writing the CPU produces the signals RE (read enable) and WE (write enable), and the address decoder 4 produces (by the address Ai that is generated by the CPU) the memory enable signal CE (chip enable) and/or the area signal $CE_{memory\ i}$, which are necessary in many segmented memory types to activate the memory device 3. Various constellations between the signals and their effect on the authorization check will be described in more detail hereinafter with reference to the table of FIG. 10.

Figure 2:
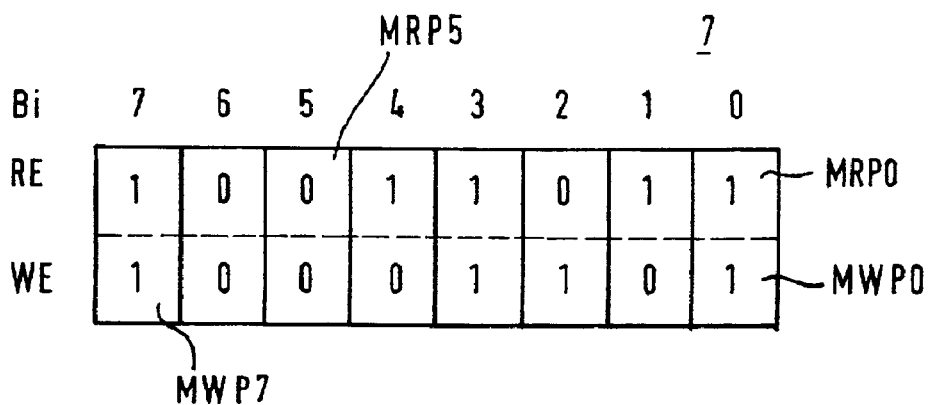
FIG. 2 shows schematically a memory protection control register with contents.

FIG. 2 shows schematically an example of the MPCR 7 with assumed contents. The MPCR register 7 in FIG. 2 contains sixteen (16) locations that are in a "0" or "1" state and together correspond to a data word consisting of 16-bits D0 to D15. Assuming that the memory device 3 is divided into eight different areas B0 to B7, two different 8-bit areas can be formed from the 16-bit data word. One of the areas defines the respective read access authorizations and the other area the respective write access authorizations. With the first eight bits a positive or negative read access authorization MRP0 to MRP7 is defined for each of the eight areas B0 to B7. With the second eight bits a positive or negative write access authorization MWP0 to MWP7 is defined for each of those areas. If the capacity of the MPCR 7 is less than 16-bits, the sixteen access authorizations will be stored in two separate registers.

The state "1" stored for the respective memory area Bi inhibits access, and the state "0" enables it. The choice as to which state in the MPCR register 7 defines free access or inhibition is of course arbitrary. However, it must be ensured that in the unprogrammed state all bits of the MPCR register 7 are in an enable state. Otherwise, subsequent programming of the MPCR register 7 and the memory device 3 would no longer be possible. If a particular state is predetermined for the unprogrammed MPCR 7 by the technology used, this state will if necessary be corrected by a subsequent inverter or by reading the inverted register contents.

FIG. 3 is schematic illustration of the address decoder 4. The address decoder 4 receives address bits AD0 to ADn that are applied in parallel, and provides a plurality of decoder output signals $CE_{memory\ n}$ each associated with a respective area to be decoded, B0 to Bn (FIG. 1). The decoder also provides global memory chip enable (CE signal) that relates to the entire memory area B, when an address is recognized within the entire address range. As a numerical example, possible areas B0, B1, B2, Bn are given in hexadecimal format. To prevent ambiguity of the logic operation, it must be ensured that only a single area signal $CE_{memory\ i}$ is in the "1" state at any given time.

Figure 4:
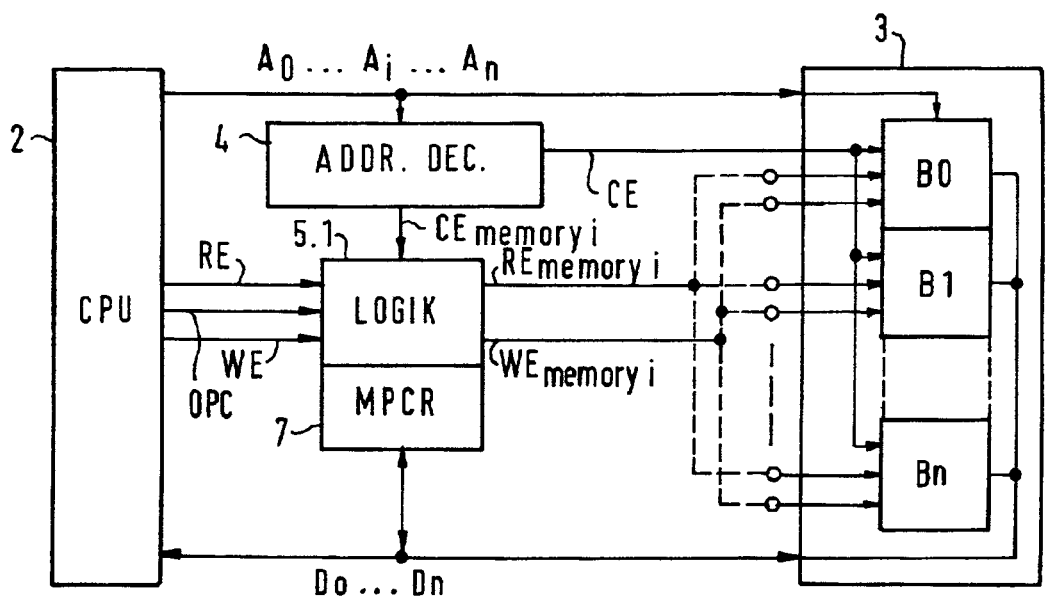
FIG. 4 shows a first protection circuit with typical signals.

FIG. 4 shows a block diagram similar to that of FIG. 1. For the memory device 3 a segmented memory type is used whose individual areas Bi must be selected with an area read enable signal $RE_{memory\ i}$ or an area write enable signal $WE_{memory\ i}$. In addition, only a global memory enable signal CE applied in parallel to all areas B0 to Bn is necessary. The area signal $CE_{memory\ i}$ from the address decoder 4 is fed to the logic device 5.1, which combines this signal with the signal RE or WE from the CPU 2 to produce an area read enable signal $RE_{memory\ i}$ or an area write enable signal $WE_{memory\ i}$, respectively. Only if these signals correspond with the selected memory area Bi can this area be read from or written to. This is ensured by selecting only a single area Bi with the area read or write enable signal. The other areas are not selected. The area read or write enable signal will be produced only if the access authorization check in the logic device 5.1 using the signals RE, WE, OPC, $CE_{memory\ i}$ and the signals TEST and JTAG (not shown) determines an authorized access. In the event of an unauthorized access, the output of the signal $RE_{memory\ i}$ or $WE_{memory\ i}$ by the logic device 5.1 will be blocked. The global signal CE can also be blocked by a suitable gate circuit if necessary.

Figure 5:
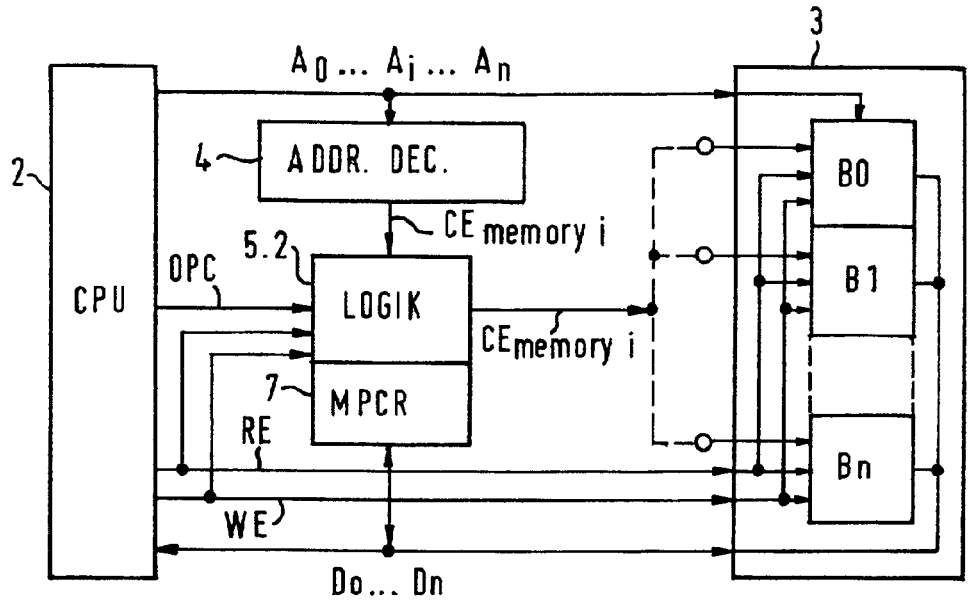
FIG. 5 shows a second protection circuit with typical signals.

The block diagram of FIG. 5, like FIG. 4, includes a segmented memory device 3. However, unlike FIG. 4 the area selection is made not by the area signal $CE_{memory\ i}$ from logic device 5.2, rather than an area read enable or an area write enable signal. The read enable signal RE or write enable signal WE from the CPU 2 relates to the entire memory device 3. As in FIG. 4 an access check is made in the logic device 5.2. If an unauthorized access is detected the area signal $CE_{memory\ i}$ necessary to access memory device 3 will be inhibited. The global read or write enable signal RE, WE can also be blocked by a suitable gate circuit if necessary. In FIG. 5 that is not the case; the signals RE, WE are therefore fed to the memory device 3 directly (i.e., without passing through logic device 5.2).

Figure 6:
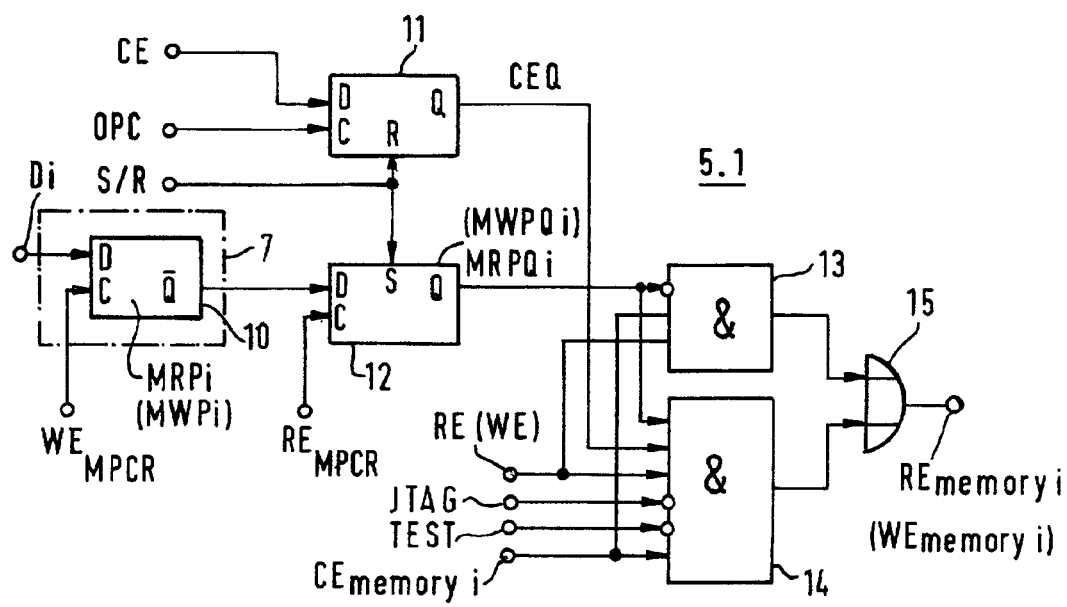
FIG. 6 shows a first logic device.

FIG. 6 shows the logic device 5.1 of FIG. 4 in greater detail for the read case. To permit the memory device 3 to be read according to the read enable signal RE from the CPU 2 in the event of an authorized memory access, the logic device applies an area read enable signal $RE_{memory\ i}$ to the memory device. Of the MPCR 7, only a single memory cell 10 is shown with the symbol of a D flip-flop. If the contents MRPi of the memory cell 10 are to be changed, a new data bit Di will be written into the memory cell 10 via the data line connected to the D input. The write clock is a register write enable signal $WE_{MPCR}$ from the CPU 2. If the MPCR 7 is part of a flash memory, account must be taken of the fact that the unprogrammed memory state corresponds to the logic "1" level. To prevent this state from being interpreted as inhibiting information in the subsequent logic device 5.1, the contents MRPi of the memory cell 10 are read out in inverted form. In the D flip-flop 10 this function is provided by the inverting output. A stored "1" thus becomes a "0" and vice versa.

The check as to whether a read access or a data access to the memory device 3 is taking place is made via a D flip-flop 11. The D flip-flop 11 is clocked with the op-code fetch signal OPC at the C input, and thus accepts a memory enable signal CE present at the D input. The signal provided at the Q output of this flip-flop 11 is an auxiliary signal CEQ that is in the "1" state until a new instruction access OPC without the memory enable signal CE is signaled. The "1" state of the auxiliary signal CEQ thus signals that the last instruction access was an access to the memory device 3. In the "0" state, the auxiliary signal CEQ ultimately causes the area read enable signal $RE_{memory\ i}$ to be inhibited. Via a reset input R the flip-flop 11 can be set to the "0" state by an internally or externally generated set-reset signal S/R. This is appropriate upon power-up, because in this unstable operating state no memory access should take place. Preferably, a flip-flop with a "transparent-latch" behavior will be used for the D flip-flop 11 so that during start-up (i.e., as long as no clock signal OPC is generated for the C input) the Q output will already see the memory enable signal CE present at the D input, and can transfer this signal as current information to the subsequent AND gates 13, 14.

The check whether the MPCR 7 contains inhibiting or enabling information as contents MRPi is made by a D flip-flop 12 whose D input is connected to the data output of the memory cell 10. The respective valid information MRPi is transferred in response to a register write enable signal $RE_{MPCR}$. It is provided as a signal MRPQi at the Q output for further logic combination. The signal is related to the contents of a single memory cell 10 and applies for a single memory area Bi only. The "1" and "0" states of this signal MRPQi correspond to an inhibit action and an enabling action, respectively. The inhibit action "1" is also forced via the set-reset signal S/R at a set input S of the flip-flop 12 independently of other signals (for instance at start-up).

The essential check as to whether an authorized or unauthorized memory access is taking place is made in two multiple-input AND gates 13, 14. Some of the inputs, which are marked with small circles, invert the applied signals before they are ANDed. The first AND gate 13 handles essentially those cases where the contents MRPi of the associated memory cell 10 correspond to enabling information. Then it is only necessary to check whether the addressed memory area $CE_{memory\ i}$ is actually associated with the addressed memory cell 10, and whether a read instruction RE from CPU 2 is actually present. If all three signals MRPQi, CEQ, and RE are in the correct states "0", "1", "1", the area read enable signal $RE_{memory\ i}$ will be produced for the associated area Bi by the circuit that includes an OR gate 15 following the AND gate 13.

The second AND gate 14 handles essentially those cases where the contents MRPi of MPCR cell 10 correspond to inhibiting information, that is, where in this flash example these contents are in a "0" state. As above, a check is made to see whether the addressed memory area Cei is actually associated with the addressed memory cell 10, and whether a read instruction RE from the CPU 2 is present. If all conditions are satisfied, then an authorized data access by the CPU 2 to the same memory area Bi has occurred within a complete instruction and data cycle. However, this is only true if reading of the data is not attempted via the external signals JTAG or TEST. Therefore, the absence of these signals is included in the AND operation by the gate 14. For this the negating inputs are used. The second AND gate 14 provides an area read enable signal $RE_{memory\ i}$ to the subsequent OR gate 15 only if the signals MRPQi, CEQ, RE, JTAG, TEST, and Cei are at the logic levels "1", "1", "1", "0", "0", and "1". In FIG. 6 the logic operations are illustrated by individual function blocks such as flip-flop stages, an AND gate, and an OR gate. These may, of course, be replaced wholly or in part by corresponding other hardware or software, and the logic operations may be different provided that the result is identical.

The above functional description of the logic device 5.1 of FIG. 6 relates to the read case. For the write case, the same circuit applies, with some of the signals having to be replaced by the corresponding write signals. In the representation of FIG. 6, these signals MWPi, MWPQi, WE, and $WE_{memory\ i}$ are given in parentheses at the signals to be replaced.

Figure 7:
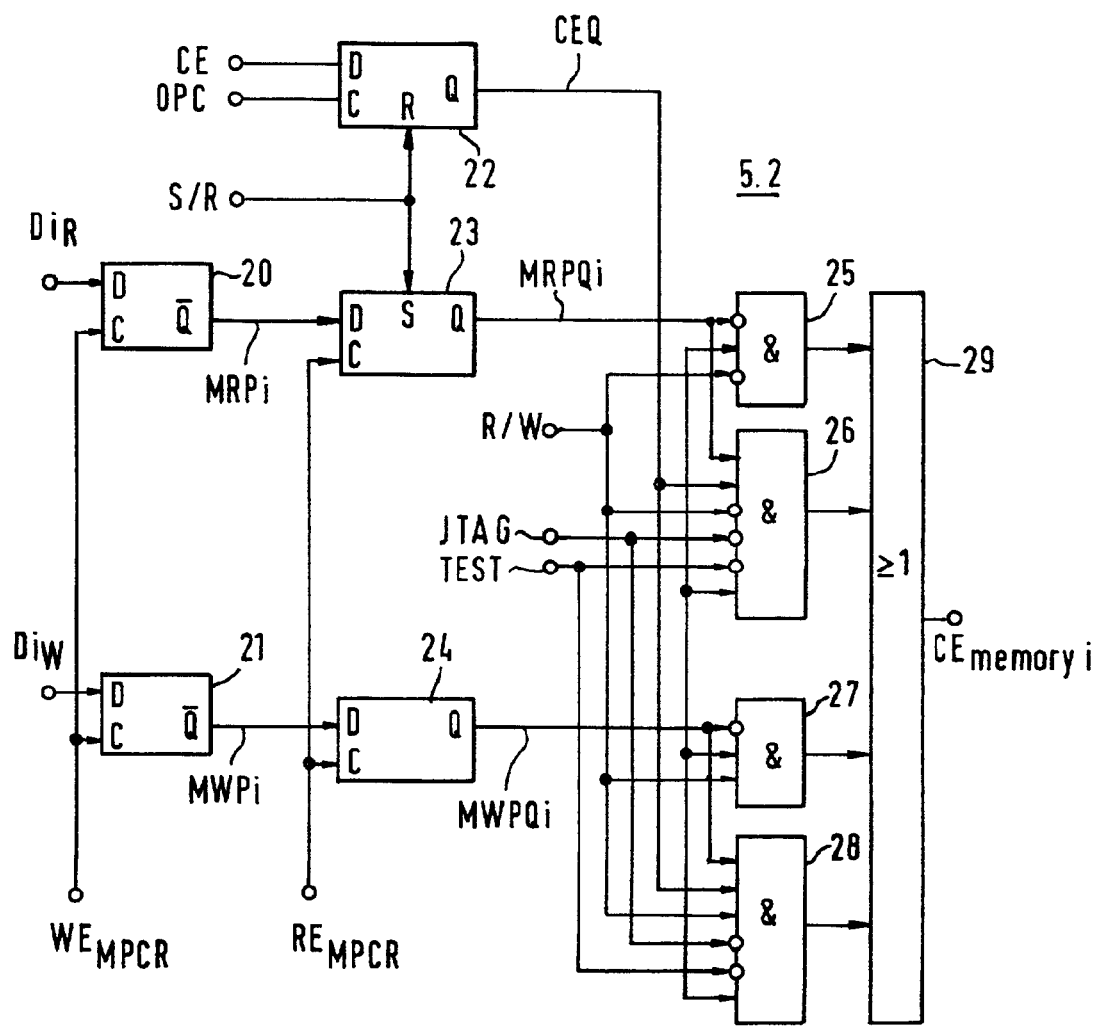
FIG. 7 shows a second logic device.

Referring now to FIG. 7, a portion of the logic device 5.2 of FIG. 5 is illustrated as an example in block-diagram form. The circuit shows the logic units and signals that are associated with a single memory area Bi. The same arrangement is necessary for each memory area. The circuit provides an area signal $CE_{memory\ i}$ when access to the memory device 3 (not shown) is permitted. The logic device 5.2 is very similar to the logic device 5.1 of FIG. 6 and includes two MPCR memory cells 20 and 21 for the read access information MRPi and the write access information MWPi, respectively. The auxiliary signal CEQ is formed by a "transparent" D flip-flop 22. The read access information is read from the cell 20 by a D flip-flop 23, and the write access information is read from the cell 21 by a D flip-flop 24. Flip-flops 23 and 24 provide as outputs an MRPQ read signal and an MWPQ write signal, respectively.

The determination of the read access authorization is made by AND gates 25, 26, and the determination of the write access authorization is made essentially by AND gates 27, 28. The outputs of all AND gates associated with an area Bi are combined by an OR gate 29 that provides an area signal $CE_{memory\ i}$ when at least one of the four AND gates 25–28 is at logic "1". The distinction between read and write operation can be made via the read and write enable signals RE, WE. The two signals may also be combined into a single read-write signal R/W as in FIG. 7, with the logic "0" level signifying "reading" and the logic "1" level signifying "writing". Each of the AND gates 25, 26, 27, 28 has at least three inputs, with the inverting inputs marked in FIG. 7 with a small circle. The assignment of the individual signals to the individual AND gates is readily apparent from the drawing. The logic operations applied to the digital signals in the logic device 5.2 can also be implemented wholly or in part using suitable software or corresponding other hardware. Also, the logic may be different if the result remains the same.

Figure 8:
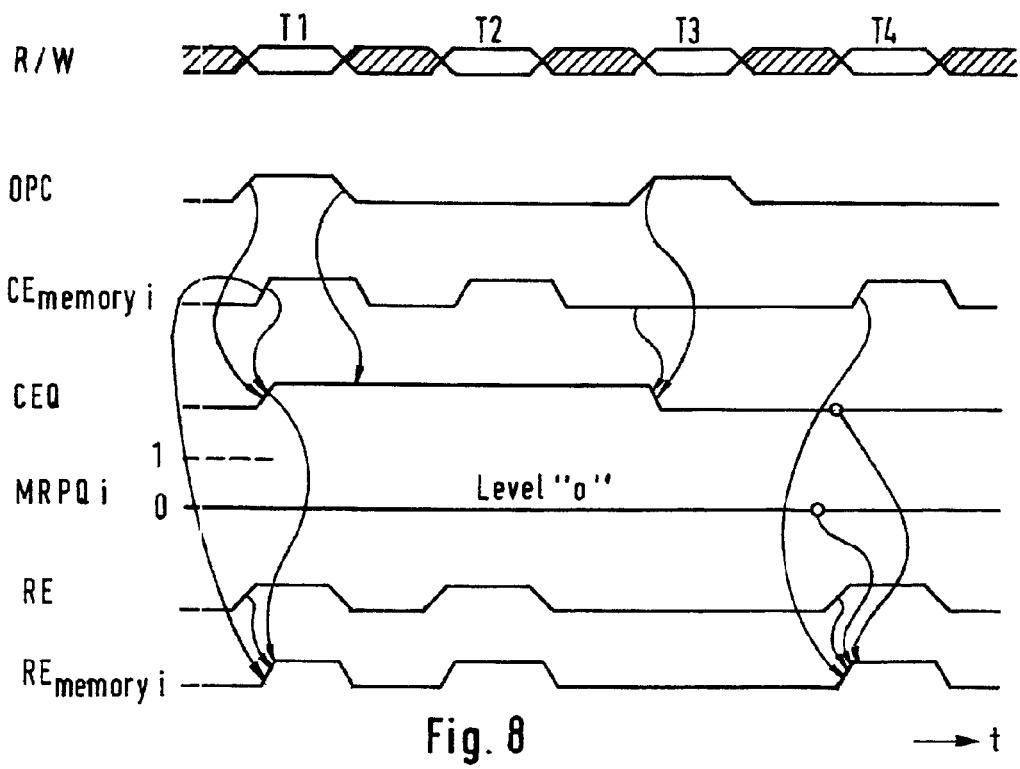
FIG. 8 shows a timing diagram for the enable case.

In FIG. 8 the waveforms of some signals of the logic device during a read operation are shown in a timing diagram. The underlying logic device corresponds approximately to the logic device 5.1 of FIG. 6 with memory access enabled. The first row shows a combined read-write signal R/W that signifies "reading" in one logic state and "writing" in the other. In the unhatched area the state of the R/W signal is valid; in the hatched areas, it is arbitrary. The associated clock periods T1, T2, T3, and T4 correspond to the equidistant areas of the R/W signal. The clock signal proper is not shown. Instead of the signals shown the inverted or inverse signals may of course be used provided that the logic is adapted accordingly.

In the first clock period Ti an instruction access by the CPU 2 to the memory device 3 is taking place. This is indicated by the op-code fetch signal OPC in line 2 and the memory area signal $CE_{memory\ i}$ in line 3 of the waveforms shown in FIG. 8.

The instruction access is followed by a read access to the same memory area Bi in the second clock period T2. This is signaled by the memory area signal $CE_{memory\ i}$ in clock period 2. An OPC signal is not produced because the access is a data access. On the other hand the data access is part of a complete instruction data cycle to the same memory area Bi. This is indicated by the signal CEQ in the fourth line, which is set to the "1" state in the first clock period T1 and reset only in the third clock period T3 by the new OPC signal.

In the third clock period T3 a new instruction data cycle begins. However, the cycle extends not to the previous memory area Bi, but to another memory area or another data source or data sink.

In clock period T4 it is assumed that in the current instruction data cycle an access to memory area Bi is initiated somehow. This is indicated by the area signal $CE_{memory\ i}$ at the time T4, without the CEQ signal being set simultaneously. Such an access can be initiated for example via a TJAG instruction (not shown).

The first four lines have nothing to do with a positive or negative access authorization, but with these signals R/W, OPC, $CE_{memory\ i}$, and CEQ, the current status of the entire system is described.

The fifth line shows the read access authorization signal MRPQi for the area Bi. This signal is constantly at logic "0" and therefore signifies free read access to memory area Bi.

The sixth line shows the waveform of the global read enable signal RE, which is activated by the CPU 2 whenever the latter fetches instructions or retrieves data from the memory device 3, that is, during the first, second, and fourth clock periods. The instruction fetch in the third clock period T3 does not initiate a read instruction RE, because the instruction data cycle started with the second op-code fetch signal does not access the memory device 3.

The seventh line shows the resulting area read enable signal $RE_{memory\ i}$, which is identical to the read enable signal RE except for a short time delay as a result of the signal propagation time through the logic stages, because an inhibit action is not provided for reading from this memory area Bi. To show the interdependence of the signals in the timing diagram, FIGS. 8 and 9 include arrows in the areas of some signal changes to mark the initiating and resulting signal changes and signal states.

Figure 9:
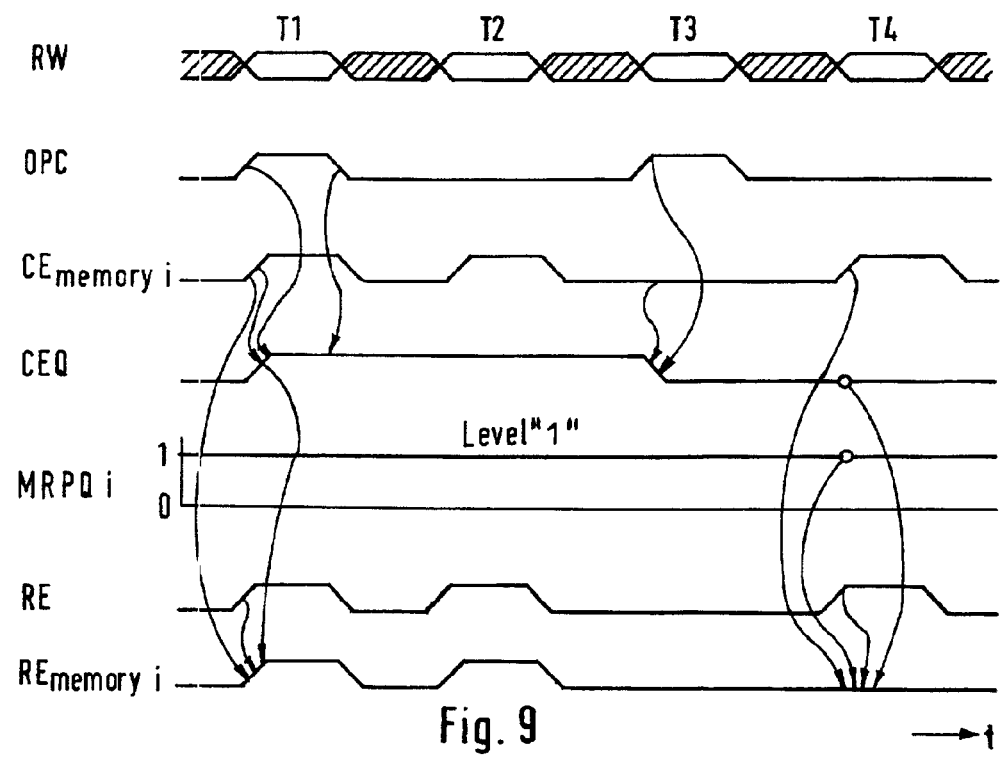
FIG. 9 shows a timing diagram for the disable case.

The timing diagram of FIG. 9 is similar to that of FIG. 8. The main difference lies in the fact that the read access authorization MRPQi in line 5 is at logic "1" and thus blocks the memory area Bi for unauthorized read accesses.

To permit a comparison, in the four clock periods T1, T2, T3, and T4 of the timing diagram of FIG. 9, the same operations as in FIG. 8 are described. Therefore, the first four lines with the signals R/W, OPC, $CE_{memory\ i}$, and CEQ are identical in FIGS. 8 and 9. Only with the MRPQi signal of the fifth line does the timing diagram of FIG. 9 become different.

The first and second clock periods T1, T2 comprise a regular instruction data cycle to the same memory area Bi. The read operation initiated by the CPU 2 in the first and second clock periods T1, T2, however, is to take place unhindered despite the inhibit information. The resulting area read enable signals $RE_{memory\ i}$ in the first and second clock periods are thus formed as in FIG. 8. In the case of the memory access attempt in the fourth clock period T4, things are different. The fact that this is not a regular access follows from the "0" level of the auxiliary signal CEQ. This signal in conjunction with the inhibiting signal MRPQi, inhibits the area read enable signal $RE_{memory\ i}$ so that reading in area Bi is not possible despite a correct area signal $CE_{memory\ i}$.

FIG. 10 shows in the form of a table the operation of the logic device 5.1 of FIG. 6. The individual rows show the respective logic levels "0" and "1" of the signals contained in the individual columns: the area-related read access authorization MRPi, the auxiliary signal CEQ, the JTAG signal, the TEST signal, the memory area signal $CE_{memory\ i}$, the global read enable signal RE, and the area read enable signal $RE_{memory\ i}$. The last column shows the action resulting from the preceding signals: "read" or no read action.

In the first three rows, the read access authorization $MRPQ_i$ is in the "0" state, and this means that read access to the associated memory area Bi is not to be inhibited, but that free access to this area is to be allowed. For this access authorization, the states of the signals CEQ, JTAG, and TEST are arbitrary. However, the logic device checks whether there is a contradiction between the area signal $CE_{memory\ i}$ and the global read enable signal RE. Therefore, in row 1 no read action takes place because the signal RE is inactive. In row 2, no read action takes place because the area signal $CE_{memory\ i}$ is inactive. Only in the third row are the area signal and the global read enable signal set, so that the area read enable signal $RE_{memory\ i}$ is in the "1" state. Therefore, the memory device 3 is read at the addressed location. The logic operations of rows 1, 2, and 3 are performed in the AND gate 13 of FIG. 6.

In rows 4–9 read protection is active and as a result the signal $MRPQ_i$ is in the "1" state. The logical operations applied to the signals in these rows must be such that any read access to the associated memory area $B_i$ is prevented unless this is the above-described regular access, in the event of which the signals JTAG and TEST must be inactive, i.e., in the "0" state—the latter case is shown in row 9. That the access in row 4 is not a regular access already follows from the fact that the global read enable signal RE is inactive. The access in row 5 is not a regular access either because the area signal $CE_{memory\ i}$ for this area Bi is not set, since the address delivered by the processor does not specify this memory area B. In row 6, access is denied because there is a contradiction between the auxiliary signal CEQ and the area signal $CE_{memory\ i}$. Somehow a correct area signal is present, but the processor has generated an address that is not linked with memory device 3. An incorrect auxiliary signal CEQ with the "0" state is also present in rows 4 and 5 and can therefore be included in the detection of the irregular operating state.

In rows 7–9 the auxiliary signal CEQ is in the "1" state and thus shows no contradiction to the total memory area B. However, in row 7 read access is denied because the read enable signal RE is inactive. In row 8, read access is denied because the area signal $CE_{memory\ i}$ is inactive.

Row 9 permits reading, although memory area Bi is disabled because a regular memory access by the processor 2 is taking place. However, as soon as the unauthorized reading via the signals JTAG or TEST is attempted reading will be prevented. Therefore, these two signals must be in the inactive state, which is identified by "0". This is also apparent from rows 10 and 11, which prevent reading from a disabled memory area when one or both of these signals are inactive. In that case, the logic states of the other signals are arbitrary. The memory action shown in the last column of the table corresponds to the state of the area read enable signal $RE_{memory\ i}$. The logic operations of rows 4–11 can be implemented by AND operations. This corresponds to the AND gate 14 of FIG. 6.

Although the present invention has been shown and described with respect to several preferred embodiments thereof, various changes, omissions and additions to the form and detail thereof, may be made therein, without departing from the spirit and scope of the invention.

What is claimed is:

1. A protection circuit which is coupled to a processor and a memory device, and prevents unauthorized access to the memory device, wherein in order to detect an unauthorized memory access, comprising internal and external signals serving to control the processor and the memory device or signaling the respective operational status of the processor and the memory device are applied to a logic device, and wherein, if an unauthorized memory access is detected, the logic device will inhibit the unauthorized memory access, wherein the inhibition of the memory access is effected by inhibiting at least one signal for memory control and/or by disabling an externally accessible data interface.

2. The protection circuit of claim 1, wherein the unauthorized external memory access relates to a read function and/or a write function to be protected in the entire memory device or in individual memory areas, with the write function to be protected including the protection of memory contents against unauthorized erasure.

3. The protection circuit of claim 2, wherein each memory area is assigned a separate access authorization.

4. The protection circuit of claim 1, wherein the respective memory areas are defined by area signals, and that the memory areas are each linked with an access authorization.

5. The protection circuit of claim 1, wherein the access authorization for the respective memory area is contained as a read or write access authorization in a memory protection control register.

6. The protection circuit of claim 5, wherein the memory protection control register is located in a protected area (Bi) of the memory device.

7. The protection circuit of claim 1, wherein in the logic device, a read or write instruction (RE, WE) initiated by the processor is combined with other internal or external signals.

8. The protection circuit of claim 1, wherein in the logic device, access signals for activating the externally accessible data interface are combined with other internal or external signals.

9. The protection circuit of claim 4, wherein in the logic device, the area signal is combined with other internal or external signals.

10. The protection circuit of claim 1, wherein in the logic device, an instruction cycle status signal or data cycle status signal is combined with other internal or external signals.

* * * * *

UNITED STATES PATENT AND TRADEMARK OFFICE
CERTIFICATE OF CORRECTION

PATENT NO. : 7,054,121 B2
APPLICATION NO. : 10/117975
DATED : May 30, 2006
INVENTOR(S) : Dietmar Koschella It is certified that error appears in the above-identified patent and that said Letters Patent is hereby corrected as shown below:

<u>Column 2</u>
line 18, after "thereof" insert --,--

<u>Column 6</u>
line 18, delete "13 ," and insert --13,--

<u>Column 7</u>
Line 59, delete "Ti" and insert --T1--

Signed and Sealed this

Twenty-ninth Day of August, 2006

JON W. DUDAS
*Director of the United States Patent and Trademark Office*